(12) United States Patent
Hong (10) Patent No.: US 12,078,909 B2
(45) Date of Patent: Sep. 3, 2024

(54) OPTICAL ARCHITECTURE WITH HYBRID ON-SILICON III-V MODULATOR

(71) Applicant: Intel Corporation, Santa Clara, CA (US)

(72) Inventor: Jin Hong, Saratoga, CA (US)

(73) Assignee: Intel Corporation, Santa Clara, CA (US)

( * ) Notice: Subject to any disclaimer, the term of this patent is extended or adjusted under 35 U.S.C. 154(b) by 900 days.

(21) Appl. No.: 16/877,113

(22) Filed: May 18, 2020

(65) Prior Publication Data

US 2020/0278589 A1    Sep. 3, 2020

(51) Int. Cl.
*H04B 10/548* (2013.01)
*G02F 1/225* (2006.01)
*G02F 1/21* (2006.01)

(52) U.S. Cl.
CPC ......... *G02F 1/2257* (2013.01); *H04B 10/548* (2013.01); *G02F 1/212* (2021.01)

(58) Field of Classification Search
CPC ...... G02F 1/2257; G02F 1/212; H04B 10/548
USPC ....................................................... 398/188
See application file for complete search history.

(56) References Cited

U.S. PATENT DOCUMENTS

| 10,234,701 | B2 * | 3/2019 | Morton | H03H 7/48 |
| 10,678,113 | B1 * | 6/2020 | Kowalczyk | G02F 1/2255 |
| 2006/0127102 | A1 * | 6/2006 | Roberts | H04B 10/505 |
| | | | | 398/182 |
| 2013/0223843 | A1 * | 8/2013 | Jia | H04J 14/06 |
| | | | | 398/43 |
| 2017/0168371 | A1 * | 6/2017 | Kim | G02B 6/2935 |
| 2018/0217468 | A1 * | 8/2018 | Wen | G02F 1/2257 |
| 2019/0324345 | A1 * | 10/2019 | Vera Villarroel | G02F 1/2255 |

FOREIGN PATENT DOCUMENTS

| FR | 2756440 | * | 5/1998 | H04B 10/18 |
| KR | 20220108852 A | * | 8/2022 | G02B 6/12 |

\* cited by examiner

*Primary Examiner* — Mohammad R Sedighian
(74) *Attorney, Agent, or Firm* — Akona IP PC (57) ABSTRACT

Embodiments may relate to an electronic device that includes a modulator to modulate an in-phase portion of an input signal and a quadrature portion of the input signal. The modulator may include a III-V material on a silicon substrate. In some embodiments, the III-V material may include, for example, indium phosphide (InP). Other embodiments may be described or claimed.

24 Claims, 9 Drawing Sheets

OPTICAL ARCHITECTURE WITH HYBRID ON-SILICON III-V MODULATOR

BACKGROUND

A silicon photonics-based high-speed modulator may be capable of supporting up to 400 gigabyte per second (Gb/s) based on a phase-amplitude modulation (PAM)-4 modulation scheme with four lanes of up to 100 Gb/s each. In the case of coherent applications, the silicon photonics modulator may be capable of supporting up to 64 gigabaud (GBaud) and 64 quadrature-amplitude modulation (QAM) high-order modulation, therefore supporting up to 600 Gb/s-per-lane with the use of a coherent digital signal processor (DSP).

However, a silicon photonics-based modulator may include an intrinsic limitation in areas such as a relatively high half-wave voltage ($V_{pi}$). For example, $V_{pi}$ may be on the order of between 2 volts (V) and 5 V. The silicon photonics modulator may also have a bandwidth on the order of between approximately 20 gigahertz (p) and approximately 40 GHz for both direct PAM-4 and QAM-64 applications. Therefore, it may be difficult to produce low-power and high baud rate devices for operations on the order of terabytes per second (Tb/s).

DETAILED DESCRIPTION

In the following detailed description, reference is made to the accompanying drawings which form a part hereof, wherein like numerals designate like parts throughout, and in which is shown by way of illustration embodiments in which the subject matter of the present disclosure may be practiced. It is to be understood that other embodiments may be utilized and structural or logical changes may be made without departing from the scope of the present disclosure. Therefore, the following detailed description is not to be taken in a limiting sense.

For the purposes of the present disclosure, the phrase "A or B" means (A), (B), or (A and B). For the purposes of the present disclosure, the phrase "A, B, or C" means (A), (B), (C), (A and B), (A and C), (B and C), or (A, B and C).

The description may use perspective-based descriptions such as top/bottom, in/out, over/under, and the like. Such descriptions are merely used to facilitate the discussion and are not intended to restrict the application of embodiments described herein to any particular orientation.

The description may use the phrases "in an embodiment," or "in embodiments," which may each refer to one or more of the same or different embodiments. Furthermore, the terms "comprising," "including," "having," and the like, as used with respect to embodiments of the present disclosure, are synonymous.

The term "coupled with," along with its derivatives, may be used herein. "Coupled" may mean one or more of the following. "Coupled" may mean that two or more elements are in direct physical or electrical contact. However, "coupled" may also mean that two or more elements indirectly contact each other, but yet still cooperate or interact with each other, and may mean that one or more other elements are coupled or connected between the elements that are said to be coupled with each other. The term "directly coupled" may mean that two or elements are in direct contact.

In various embodiments, the phrase "a first feature [[formed/deposited/disposed/etc.]] on a second feature," may mean that the first feature is formed/deposited/disposed/etc. over the feature layer, and at least a part of the first feature may be in direct contact (e.g., direct physical or electrical contact) or indirect contact (e.g., having one or more other features between the first feature and the second feature) with at least a part of the second feature.

Various operations may be described as multiple discrete operations in turn, in a manner that is most helpful in understanding the claimed subject matter. However, the order of description should not be construed as to imply that these operations are necessarily order dependent.

Embodiments herein may be described with respect to various Figures. Unless explicitly stated, the dimensions of the Figures are intended to be simplified illustrative examples, rather than depictions of relative dimensions. For example, various lengths/widths/heights of elements in the Figures may not be drawn to scale unless indicated otherwise. Additionally, some schematic illustrations of example structures of various devices and assemblies described herein may be shown with precise right angles and straight lines, but it is to be understood that such schematic illustrations may not reflect real-life process limitations which may cause the features to not look so "ideal" when any of the structures described herein are examined, e.g., using scanning electron microscopy (SEM) images or transmission electron microscope (TEM) images. In such images of real structures, possible processing defects could also be visible, e.g., not-perfectly straight edges of materials, tapered vias or other openings, inadvertent rounding of corners or variations in thicknesses of different material layers, occasional screw, edge, or combination dislocations within the crystalline region, and/or occasional dislocation defects of single atoms or clusters of atoms. There may be other defects not listed here but that are common within the field of device fabrication.

As noted, a silicon photonics-based modulator may have limitations with respect to areas such as $V_{pi}$ or bandwidth. One option to address these limitations may be the inclusion of a III-V material-based modulator. One example III-V material may be, for example, indium phosphide (InP). The III-V modulator may have higher modulation bandwidth, for example on the order of 65 GHz or more, and may support greater than 100 GBaud operation with multi Tb/s-per-lane coherent transmission when used in conjunction with a coherent DSP. In addition, the $V_{pi}$ of the III-V modulator may be made relatively low (e.g., less than 2V. For example, the $V_{pi}$ of an III-V modulator may be between approximately 1 and approximately 1.5 V), thereby reducing the power consumption of an optical transmission of which the III-V modulator is a part.

However, it may be difficult to produce a III-V material-based optical transmitter that is appropriate for coherent applications. For example, it may be difficult to achieve a high-yield/low-loss optical polarization splitter and rotator. Such a splitter or rotator may require many process and regrowth steps to achieve complex functions based on a III-V system. As a result, the yield of such a process may be relatively low and have a relatively high manufacturing cost. It may also be challenging to produce such complex III-V based devices based on available fabrication processes.

Embodiments herein relate to resolving the above-described difficulties by incorporating III-V materials such as InP onto a silicon photonics platform, thereby leveraging the strength of both platforms to produce high-speed optical transmitters. Specifically, embodiments herein may relate to a transmitter architecture design that includes a modulator with an increased bandwidth capability. The bandwidth capability may be based on a high-speed III-V epitaxial material that is grown to support a high-speed/low-$V_{pi}$ III-V material-based modulator. With such a high-speed epitaxial design, several dies that include an epitaxial III-V layer may be placed onto a handling silicon wafer. The handling wafer may be wafer-bonded onto a device silicon wafer. Subsequently, the handling wafer and majority of the III-V epitaxial substrate and layers may be removed, and one or more thin layers of active materials with some number of optical confinement layers may remain.

On the silicon device wafer, the optical waveguides may be configured to support a Mach-Zehnder modulator ("MZM") (e.g., the optical waveguides may diverge to allow for two concurrent optical paths for the optical signal as it traverses the modulator). The epitaxially-grown III-V layer(s) on the device wafer may be designed such that light emitted from a laser (either of the optical transmitter or coupled to the optical transmitter) such that light may be gradually coupled and input to the modulator herein it is modulated by the III-V materials, and the modulated light may then be gradually output and coupled to the output waveguide.

Embodiments herein may provide a number of advantages or benefits. For example, embodiments may include benefits from both III-V materials and silicon photonics systems in a single modulator, which may be referred to herein as a "hybrid" modulator. As a result, embodiments may enable ultra high-speed modulation in a silicon photonics platform that is capable of supporting greater than 100 GBaud PAM applications per physical channel and high-capacity coherent QAM applications beyond Tb/s per wavelength.

Turning to particular embodiments, configurations of the hybrid modulator may be similar to those of a MZM. Specifically, the hybrid modulator may include two different optical paths through the modulator for a single signal. Based on the interference pattern of the optical paths once they are recombined, data may be encoded into the optical signal to produce a modulated optical signal. In these particular embodiments, the MZM structure may include silicon waveguides on a device wafer, and may further include III-V epitaxial materials which may be a part of the MZM structure. Particularly, the III-V materials may be in alignment with the input and output waveguides of the modulator. In some embodiments, the optical transmitter may include a number of hybrid modulators which may be formed together for coherent applications or non-coherent multiple-channel applications. As used herein, a coherent application may refer to a single-wavelength high-order QAM modulation scheme and a non-coherent application may refer to a multi-channel PAM modulation scheme.

Figure 1:
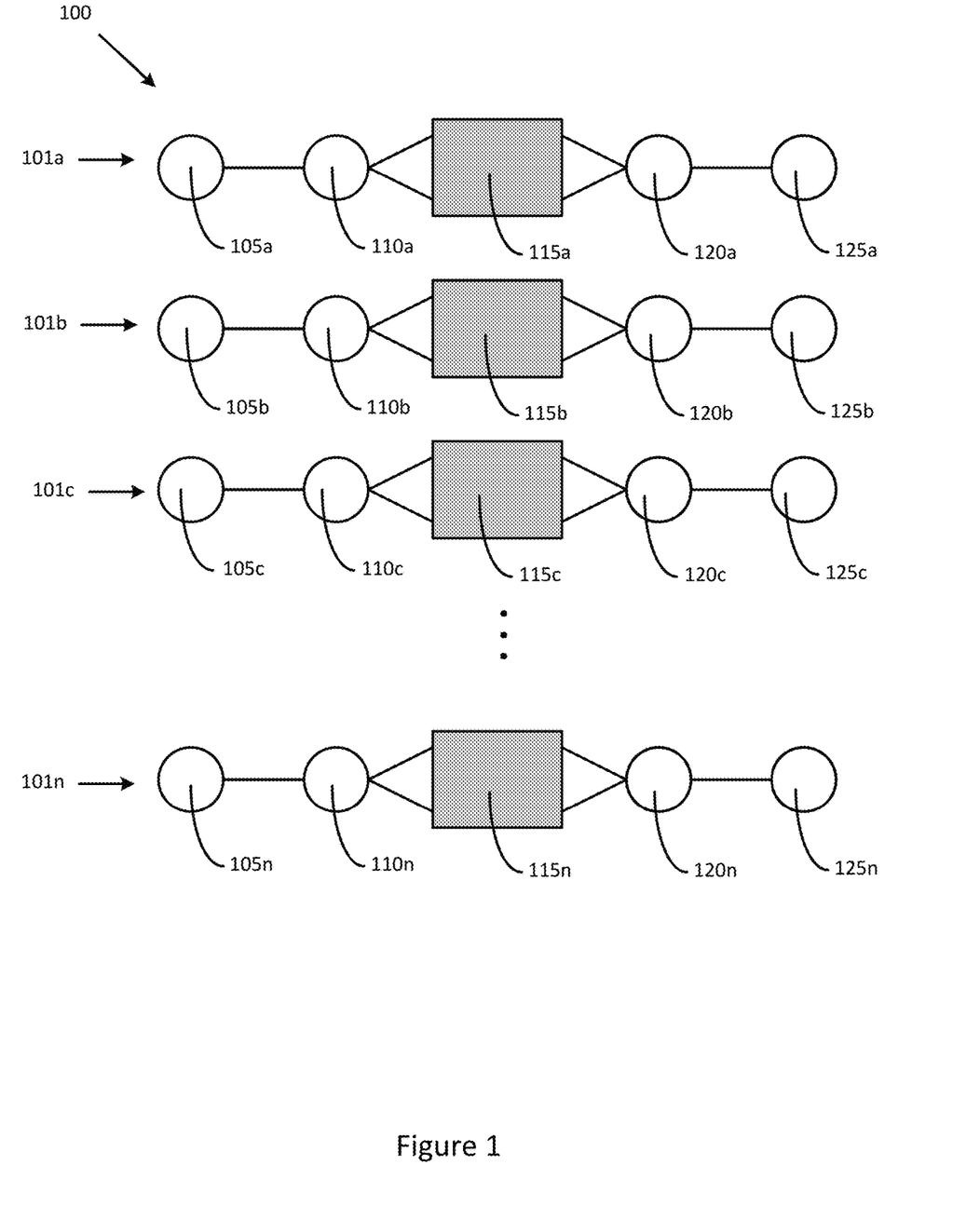
FIG. 1 depicts an example optical architecture that includes a hybrid modulator, in accordance with various embodiments.

FIG. 1 depicts an example optical transmitter architecture that includes a hybrid modulator, in accordance with various embodiments. It will be understood that FIGS. 1 and 2-7 are intended as highly simplified examples of the architecture of an optical transmitter with respect to how light may propagate through the optical transmitter. The depicted architectures do not depict various active or passive elements such as additional logic, transistors, resistors, capacitors, etc. which may be present in real-world embodiments of the present disclosure. Additionally, although a certain number of structures or elements may be depicted (e.g., a specific number of paths, modulators, splitters, inputs or outputs, monitor photodiodes (MPDs), amplifiers, etc.) other embodiments may have more or fewer than are depicted herein, or elements at different locations in the diagram. As one example, although some embodiments may depict elements such as amplifiers located both prior to, and subsequent to, the modulator, in some embodiments an amplifier may not be present at the input or the output (or both) of the modulator. Additionally, various embodiments are depicted herein for the sake of discussion of various aspects of the present disclosure, but it will be understood that the depictions are intended as non-limiting examples. That is, other embodiments may include combinations of aspects of various of the embodiments. It will also be understood that although signals herein are described as "optical" signals, in some embodiments the signals may be some other type of photonic signal that has, for example, a different frequency or wavelength.

FIG. 1 depicts an optical architecture 100. The optical architecture 100 may have a number n of optical pathways 101a, 101b, 101c, 101n (collectively, "optical pathways 101"). In some embodiments, n may be between 1 and 32, while in other embodiments n may be higher than 32. The number n of optical pathways 101 may be based on factors such as design characteristics of the optical architecture 100, the type of device in which the optical architecture 100 (and the corresponding optical transmitter) may be used, etc. Each of the optical pathways 101 may have a bandwidth of at least approximately 200 Gb/s or more. This may be compared to, for example, legacy MZMs which may have a bandwidth on the order of approximately 100 Gb/s.

As may be seen, respective ones of the optical pathways 101 may include a signal input 105a/105b/105c/105n (collectively, "signal inputs 105"). The signal inputs 105 may be inputs wherein an optical signal may be received. In some embodiments, the signal inputs 105 may receive an optical signal from respective lasers (e.g., a different laser for each optical pathway 101) while in other embodiments two or more of the signal inputs 105 may receive an optical signal from a single laser after the signal has been split (e.g., by an optical splitter).

The optical signal may traverse from a signal input 105 to a splitter such as splitters 110a/110b/110c/110n (collectively, "splitters 110"). The splitters 110 may split the signal for input to the modulators 115a/115b/115c/115n (collectively, "modulators 115"). The modulators 115 may be hybrid modulators as described herein. Particularly, the modulators 115 may include an epitaxially-deposited III-V material such as InP on a silicon waveguide substrate as will be described in greater detail with respect to FIGS. 2a and 2b. As previously noted, the modulators 115 may be configured to act as a MZM, and so two optical pathways through respective ones of the modulators 115 may be desirable for the operation as previously described.

After the optical signal has been modulated by one of modulators 115, the optical signal may then be recombined by a coupler such as couplers 120a/120b/120c/120n (collectively, "couplers 120") which may recombine the signal to form a modulated optical signal. The modulated optical signal may then be output by a signal output such as signal outputs 125a/125b/125c/125n (collectively, "signal outputs 125").

Figure 2A:
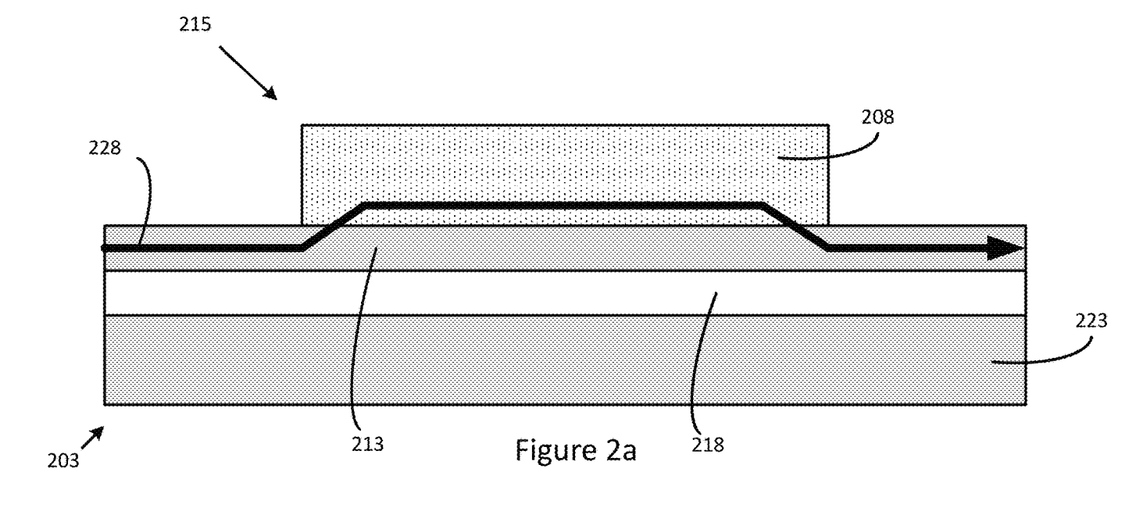
FIGS. 2a and 2b depict an example structure of a photonic transmitter that includes a hybrid modulator, in accordance with various embodiments.
Figure 2B:
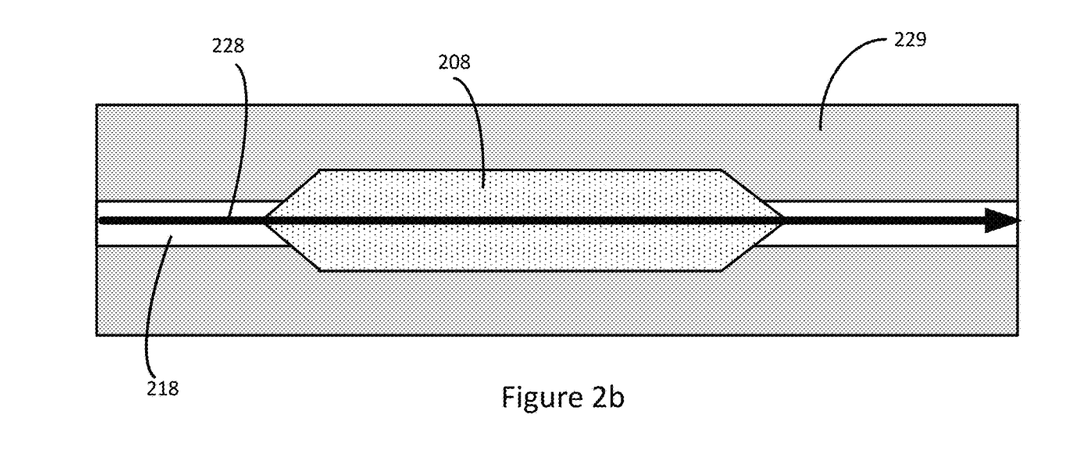

FIGS. 2a and 2b depict an example structure of a photonic transmitter that includes a hybrid modulator, in accordance with various embodiments. Specifically, FIG. 2a depicts a cross-sectional view of such a structure, while FIG. 2b depicts an example top-down view of the structure. The modulator 215 may be similar to, for example, one of modulators 115, and may be coupled with a substrate 203.

The substrate 203 may include a plurality of layers such as the silicon waveguide 213, a buried oxide layer 218, and a dielectric material 223. The substrate 203 may be, for example, considered to be a cored or coreless substrate. The substrate 203 may include one or more layers of the dielectric material 223. The dielectric material 223 may be organic or inorganic and may be, or include, silicon, a build-up film (ABF) or some other type of dielectric material. The substrate 203 may further include one or more conductive elements such as vias, pads, traces, microstrips, striplines, etc. Various of the conductive elements may be internal to, or on the surface of, the substrate 203. Generally, the conductive elements may allow for the routing of signals through the substrate 203, between elements that are coupled to the substrate 203, etc. In some embodiments the substrate 203 may be, for example, a printed circuit board (PCB), an interposer, a motherboard, or some other type of substrate.

As noted, the substrate 203 may include a silicon waveguide 213. The waveguide 213 may be configured to propagate a signal such as an optical signal 228 through the waveguide 213. In this embodiment, the silicon waveguide 213 may be or may include silicon, however in other embodiments the waveguide may be or include silicon nitride or some other material. As previously noted, in some embodiments the optical signal 228 may be in a short wavelength spectrum (e.g., having a wavelength between approximately 1200 nanometers (nm) and approximately 1400 nm). In other embodiments, the optical signal 228 may have a different wavelength such as in a longer wavelength spectrum (i.e., between approximately 1500 nm to 1600 nm. The specific wavelength of the optical signal 228 may be based on a factor such as the use case to which the modulator 215 may be put, design considerations, materials used, etc. As may be seen, the waveguide 213 may be positioned in a portion of an optical dielectric material 229 which may be the same type of dielectric material, or a different type of dielectric material, as dielectric material 223.

The substrate 203 may further include the buried oxide layer 218 positioned between the silicon waveguide 213. The buried oxide layer 218 may be formed of an optical dielectric such as, for example, silicon oxide ($SiO_2$). Specifically, the buried oxide layer 218 may be to prevent leakage of the optical signal 228 from the silicon waveguide 213 into the dielectric material 223.

The modulator 215 may include a III-V material 208. In some embodiments, the III-V material 208 may be, or include InP. Specifically, the III-V material 208 may be a quantum well (QW) or multiple quantum well (MQW) material such as an indium aluminum gallium arsenide (InAlGaAs) epitaxial layer material on InP. Specifically, the InAlGaAs material may be epitaxially grown on one or more layers of InP. The QW material may, for example, as a way of illustration only, include a range of thirty to thirty-five layers of InAlGaAs wells in layers with an identical thickness of approximately in the range of several nanometers such as from 5 to 7 nm for each QW; and alternate layers of InAlAs barriers with an identical thickness of between approximately from 8 to 10 nm for each of the barriers-. Generally, the number of the barriers may be equals to the number of the QWs plus one additional layer. The wells and barriers may alternate in the QW structure. In other embodiments, a QW material may be, for example, thirty-two layers of InAlGaAs wells and thirty-three layers of InAlAs barriers, wherein the wells and barriers alternate. In other embodiments, the III-V material 208 may be a quantum dot (QD) material or some other type of III-V material.

As may be seen, the III-V material 208 of the modulator 215 may be physically or communicatively coupled with the silicon waveguide 213. As the optical signal 228 propagates through the silicon waveguide 213, it may transfer into the modulator 215 where it may be modulated to include data that is supplied by a high-speed data source such as a processor, a processor core, a central processing unit (CPU), a high-speed driver that amplifies the incoming data signal to a proper level to drive the modulator, and etc. The now-modulated optical signal 228 may then be output from the modulator 215 back into the silicon waveguide 213 as shown.

As shown in FIG. 2b, it will be noted that in some embodiments the modulator 215, and particularly the III-V material 208, may be tapered in such a fashion as to facilitate adiabatic transference of the optical signal 228 between the III-V material 208 and the silicon waveguide 213. In some embodiments, the taper of the III-V material 208 may be in a z-direction (i.e., up and down with respect to the orientation of FIG. 2, not shown). In other embodiments, the taper of the III-V material 208 may additionally or alternatively be in a direction perpendicular to the direction of travel of the optical signal and parallel to the silicon waveguide 213. That is, the III-V material 208 may be tapered as shown in FIG. 2b. In some embodiments, the taper may be such that the III-V material 208 comes to a point as seen in a top-down view of the modulator 215. Other embodiments may have different types or degrees of tapers.

Additionally, as may be noted, in some embodiments the modulator 215 may have a greater width than the width of the silicon waveguide 213. However, in other embodiments the width of the modulator 215 may be different than as depicted with respect to the width of the silicon waveguide 213. For example, in some embodiments the modulator 215 may have a same width as, or be narrower than, the silicon waveguide 213. It will also be noted that the specific degree of taper, the type of taper, or even the existence of the taper may be different in different embodiments. It will also be noted that FIGS. 2a and 2b are intended as highly simplified example embodiments, and other embodiments may have additional elements such as additional active, passive, or conductive elements, overmold material, etc. Other variations may be present in other embodiments.

Figure 3:
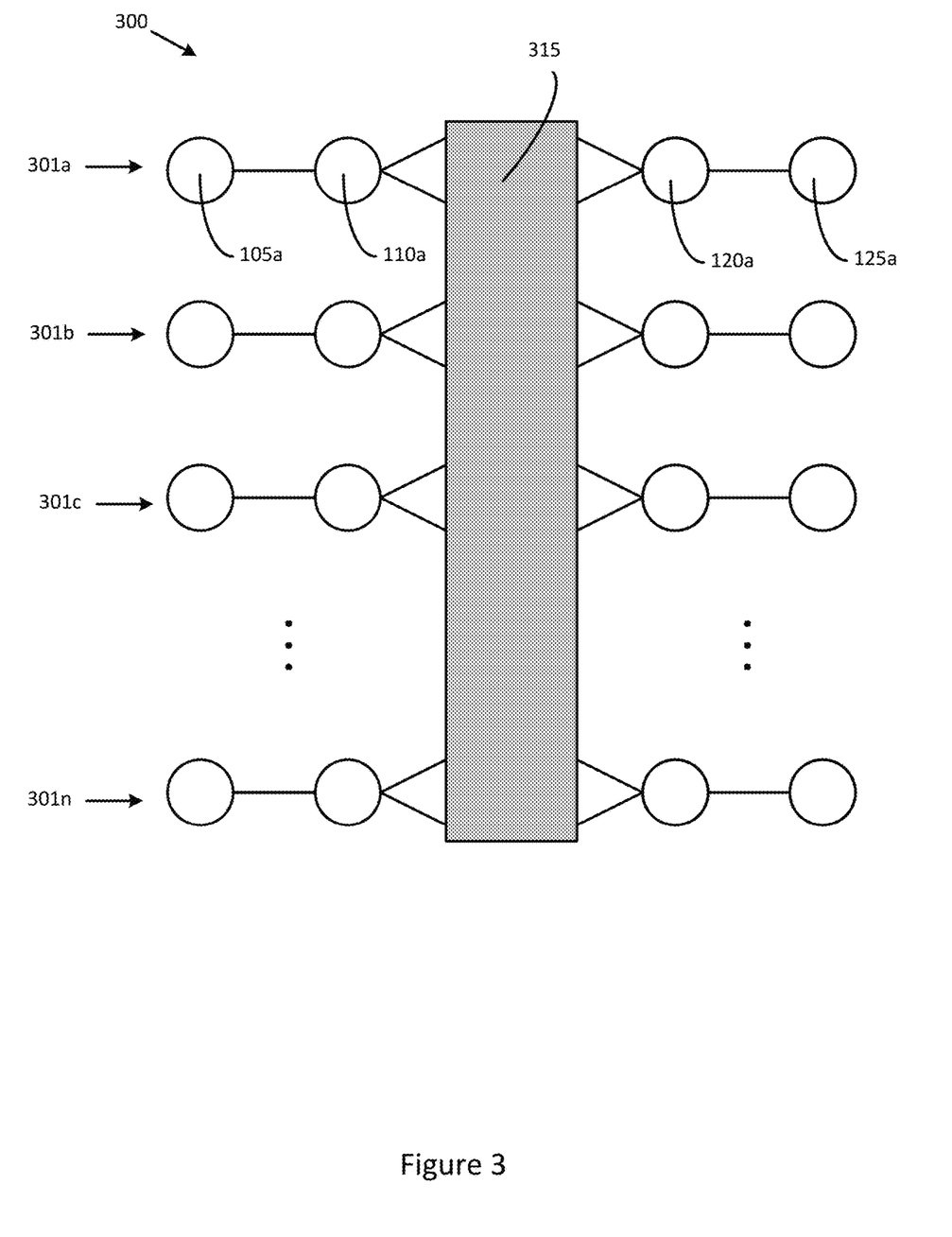
FIG. 3 depicts an alternative example optical architecture that includes a hybrid modulator, in accordance with various embodiments.

FIGS. 3-7 depict alternative example optical architectures that may include a hybrid modulator, in accordance with various embodiments. It will be understood that FIGS. 3-7 are intended as highly simplified example Figures and may not show each and every element which may be present in such an architecture. Rather, the Figures are intended to show examples of various concepts which may be applied to real-world embodiments. Such real-world embodiments may include additional elements such as active or passive components, conductive elements, etc. Additionally, it will be noted that each and every element of FIGS. 3-7 may not be enumerated for the sake of lack of redundancy or clutter of the Figures, however (unless expressly noted otherwise), it may be generally assumed that elements that share the same general shape/shading/location as enumerated and discussed elements may have similar features or characteristics Specifically, FIG. 3 depicts an example optical architecture 300 which may be similar to, and share one or more characteristics with, optical architecture 100. The optical architecture 300 may include a number of optical paths 301a, 301b, 301c, and 301d (collectively, "optical paths 301") which may be similar to, and share one or more characteristics with, optical paths 101.

However, as opposed to FIG. 1 where respective ones of the optical paths 101 may include an individual modulator 115, the optical architecture 300 may include a single modulator 315 which may span two or more of the optical paths 301 as shown in FIG. 3. Such a modulator 315 may be enabled by, for example, include a plurality of waveguides such as waveguide 213 in a single substrate such as substrate 203.

Figure 4:
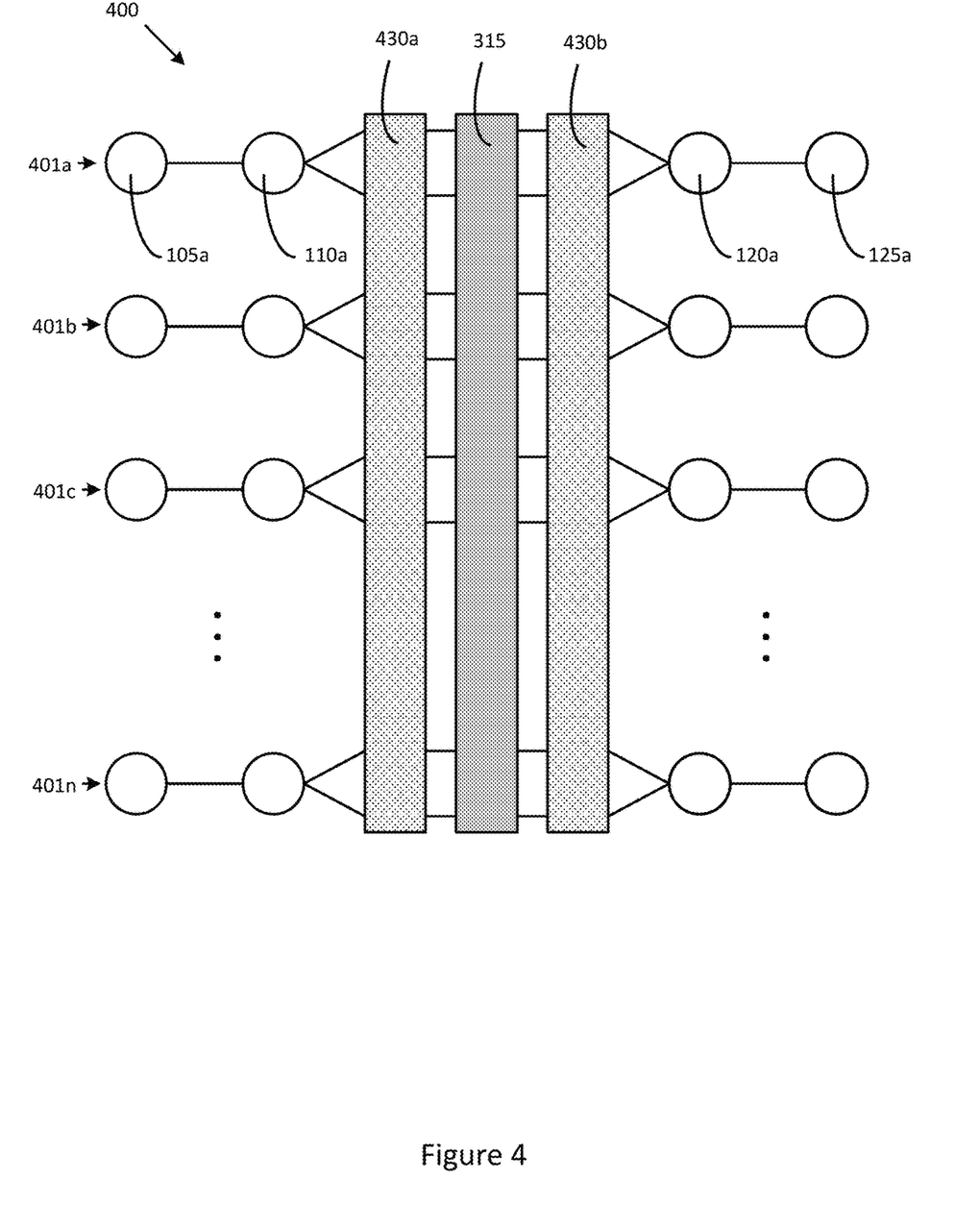
FIG. 4 depicts an alternative example optical architecture that includes a hybrid modulator, in accordance with various embodiments.

FIG. 4 depicts an example optical architecture 400 which may be similar to, and share one or more characteristics with, optical architectures 100 or 300. The optical architecture 400 may include a number of optical paths 401a, 401b, 401c, and 401d (collectively, "optical paths 401") which may be similar to, and share one or more characteristics with, optical paths 101 or 301.

However, in some embodiments the modulator 315 may result in some amount of signal loss of the optical signal as it traverses the modulator. Such a signal loss may be based on, for example, the transition from the silicon waveguide to the modulator (or from the modulator to the silicon waveguide), the act of modulation, or some other factors. Therefore, in some embodiments it may be desirable to amplify the signal either prior to, or subsequent to, the modulator 315. As shown in FIG. 4, the optical architecture may include a plurality of amplifiers 430a and 430b (collectively, "amplifiers 430"). In some embodiments, one or both of the amplifiers 430 may include a material or structure that is similar to that of the modulator 315. Specifically, in some embodiments one or both of the amplifiers 430 may include a III-V material positioned on a silicon substrate such as substrate 203. The general shape or configuration of such an amplifier may be similar to that shown with respect to modulator 215. For example, one or both of the amplifiers 430 may include a tapered portion at one or both ends of the amplifier. In other embodiments, one or both of the amplifiers 430 may be a different type of amplifier. In some embodiments, the III-V material of one or both of the amplifiers 430 may be or include InP as described above in a MQW structure, while in other embodiments one or both of the amplifiers 430 may additionally or alternatively include a QD material and structure or some other types of III-V material.

More generally, the amplifiers 430 may include a III-V material 208. In some embodiments, the III-V material 208 may be, or may include, InP. Specifically, the III-V material 208 may be a QW or MQW material such as an InAlGaAs epitaxial layer material on InP. Specifically, the InAlGaAs material may be epitaxially grown on one or more layers of InP. The QW material may, for example, as a way of illustration only, include three layers of InAlGaAs wells with a thickness of approximately 7 nm for each of the three quantum wells; and alternate layers of InAlAs barriers with a thickness of approximately 10 nm for each of the four barriers. The wells and barriers may alternate in the QW structure. In other embodiments, a QW material may be, for example, five layers of InAlGaAs wells and six layers of InAlAs barriers, wherein the wells and barriers alternate.

It will be understood that, as noted above, FIG. 4 is intended as an example embodiment. In some embodiments, one or both of the amplifiers 430 may be positioned at a different part of the optical architecture 400. For example, amplifier 430a may be positioned between signal input 105a and splitter 110a. Additionally or alternatively, amplifier 430b may be positioned between coupler 120a and signal output 125a. In some embodiments, one or both of amplifiers 430 may not be present in the optical architecture 400. In some embodiments an amplifier 430 may not span each of the optical paths 401, but rather may be span only a single optical path 401, or a portion of an optical path 401.

Figure 5:
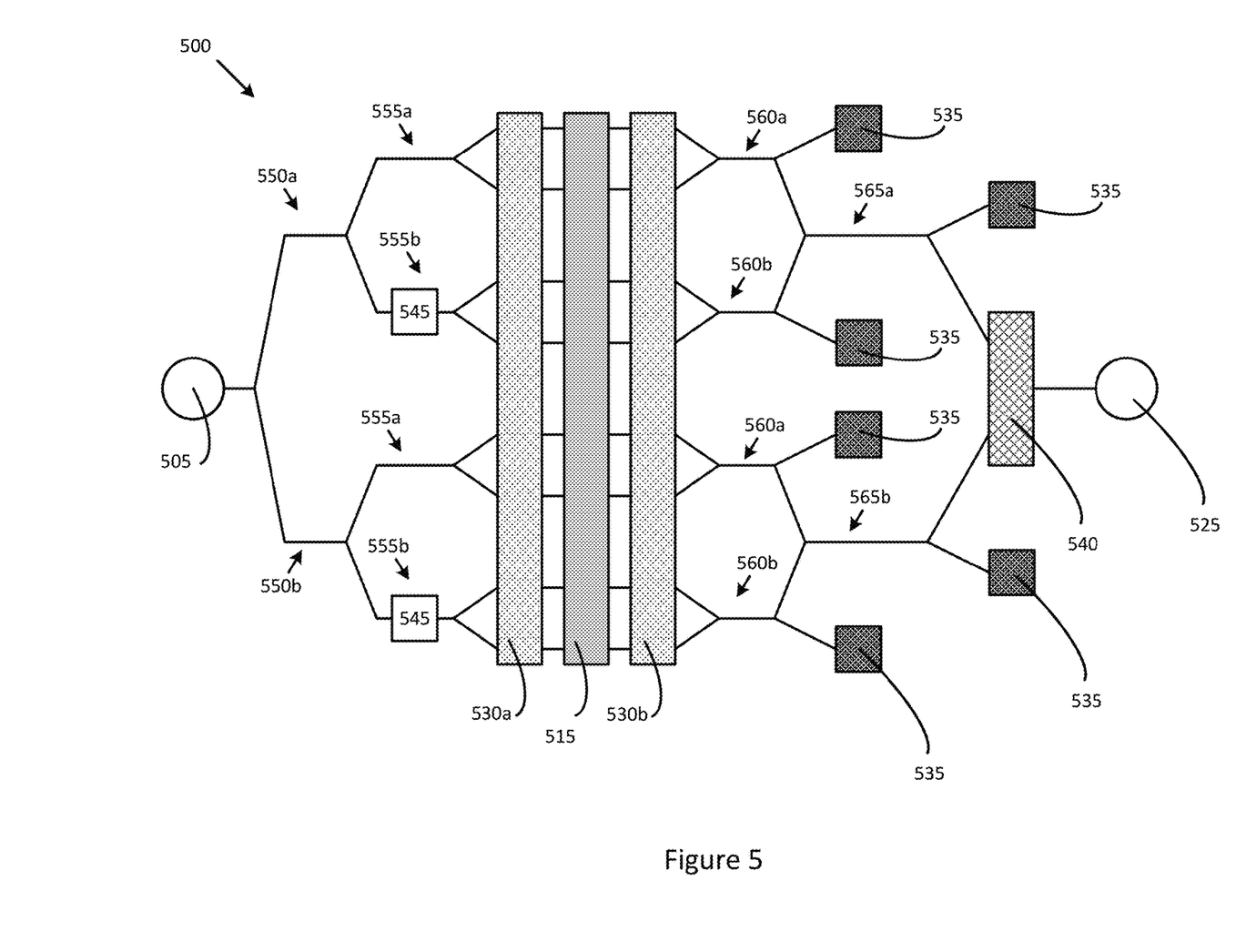
FIG. 5 depicts an alternative example optical architecture that includes a hybrid modulator, in accordance with various embodiments.

FIG. 5 depicts a more complicated architecture which may be used for an optical architecture 500. Generally, the optical architecture 500 may be similar to, and share one or more characteristics with, one or more of optical architectures 100, 300, or 400. For the sake of ease of illustration, elements of optical architecture 100 (or other optical architectures here) such as a splitter 110 or a coupler 120 may not be shown in FIG. 5 (or other Figures such as FIGS. 6 and 7). However, one of skill in the art will recognize from FIG. 5 that such elements may still be present, and where those elements may be positioned.

The optical architecture 500 may include a signal input 505, signal output 525, modulator 515, and amplifiers 530a/530b (collectively, "amplifiers 530") which may be respectively similar to, and share one or more characteristics with, signal input 105, signal output 125, modulator 115, and amplifiers 430a/430b.

The optical signal may be provided by the signal input, where it may then be split amongst two optical paths 550a and 550b (collectively "optical paths 550"). Respective ones of the optical paths 550 may then be split into different phases. For example, optical paths 555a may be in-plane portions of the optical signal, whereas optical paths 555b may be quadrature portions of the optical signal. In some embodiments, optical paths 555b may include a phase shifter 545 which may shift the optical signal to a quadrature signal. The various signals may then be input to one or more of the amplifiers 530 and modulator 515 where the signal may be modulated or amplified.

The modulator 515 may output a plurality of modulated optical signals onto in-phase output paths 560a and quadrature output paths 560b. Similarly to the input side of the optical architecture, there may be an in-phase and a quadrature output paths 560a/560b for both paths 550 of the optical signal. The modulated optical signals may be combined from the in-phase output path 560a and the quadrature output path 560b and provided output paths 565a and 565b. The modulated optical signals from output paths 565a and 565b may be input to a polarization rotator and beam combiner (PRBC) 540 where one of the signals from an output path (e.g., the modulated optical signal from output path 565a) may be rotated by 90 degrees such that the two modulated output signals have different polarizations (which may be referred to, for example, as "x-polarization" and "y-polarization"). The polarized and modulated output signals may then be combined to a single modulated optical signal that is provided to signal output 525.

As may be seen in FIG. 5, the optical architecture 500 may further include a number of monitor photodiodes (MPDs) 535 at various point along the output side of the optical architecture 500. The MPDs 535 may be used to monitor the optical power level from either the main output arm or the complimentary arm of each of the interferometers by the use of a coupler-based optical tap from the main output arm or the complimentary arm, and the additional MPD at the tap port. The MPD may be or include a silicon germanium structure or the hybrid III-V die bonded to the silicon wafer at the location of interest.

It will be understood that, similarly to other embodiments described herein, the embodiment of FIG. 5 is intended as an example embodiment, and other embodiments may vary from those depicted. For example, as noted in some embodiments certain of the amplifiers 530 may be missing, or additionally/alternatively in a different location (e.g., at 550a/b, 555a/b, 560a/b, 565a/b, etc.). In some embodiments, one or more of the modulator 515 or the amplifiers 530 may not span each of the optical paths, but rather there may be a different modulator or amplifier for each of the various input or output paths, phase-related optical paths, or even between different branches of the a MZM. Additionally, on the output side of the optical architecture 500, the MPDs 535 may be arranged in a different configuration, or there may be a different number of MPDs 535 than are depicted in FIG. 5. Other variations may be present in other embodiments.

Figure 6:
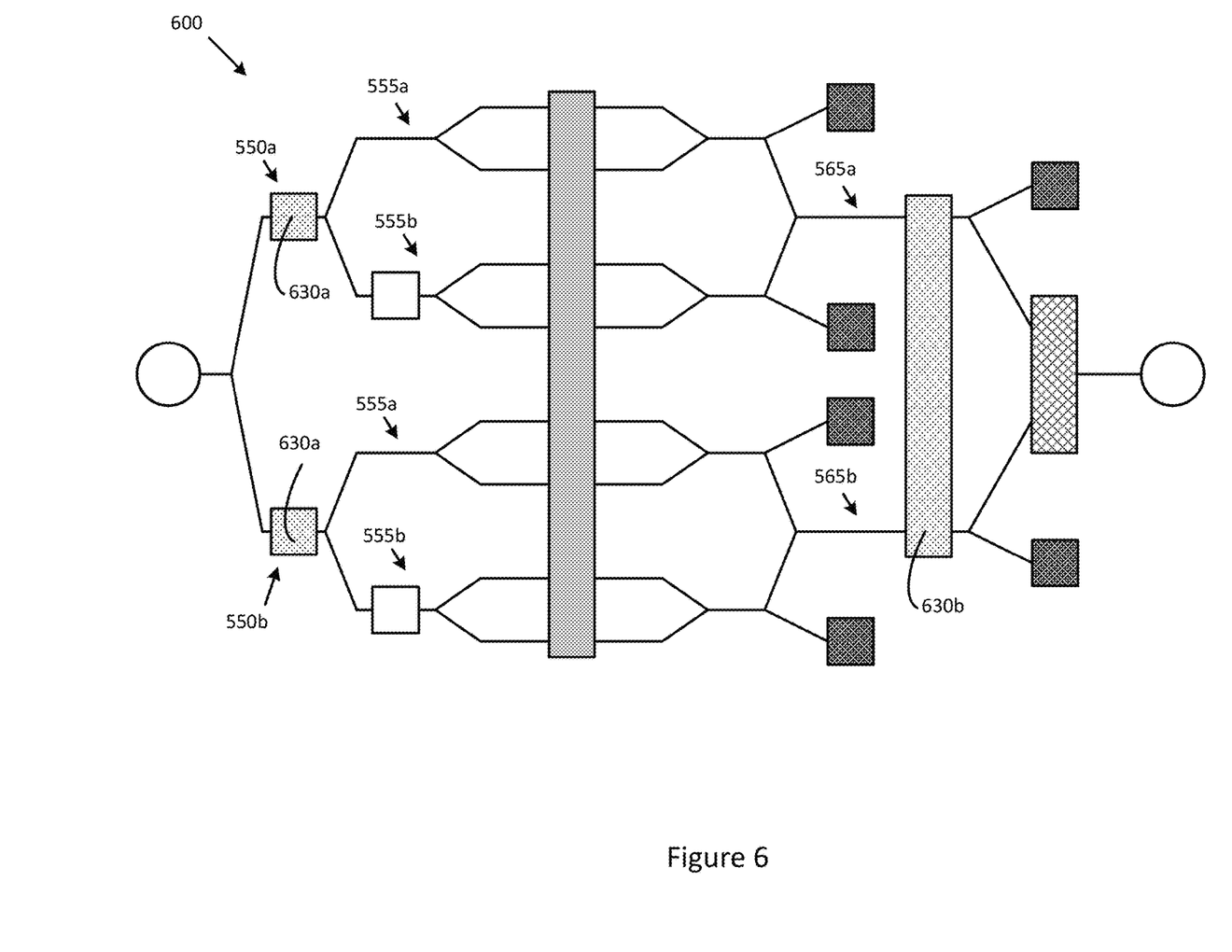
FIG. 6 depicts an alternative example optical architecture that includes a hybrid modulator, in accordance with various embodiments.

FIG. 6 depicts an alternative example optical architecture 600 which may be generally similar to, and share one or more characteristics with, optical architecture 500 or some other optical architecture herein. Amongst other things, FIG. 6 may depict an optical architecture 600 with amplifiers 630a and 630b (collectively referred to as "amplifiers 630") which may be generally similar to, and share one or more characteristics with, amplifiers 430a and 430b or some other amplifier herein. However, as may be seen by comparing the optical architecture 600 with optical architecture 500, the amplifiers 630 may be at a different location within the signal path of the optical architecture 600. Specifically, amplifiers 630a may be located in the optical paths 550a and 550b, while amplifier 630b may be located at output paths 565a and 565b. As previously noted, it will be realized that this is an example embodiment and other embodiments may vary. For example, the two amplifiers 630a may be replaced by a single amplifier that spans both of the optical paths 550a and 550b. Similarly, the single amplifier 630b may be replaced by separate amplifiers at respective ones of the output paths 565a and 565b. In some embodiments, the input-side amplifier may be as shown with respect to amplifier 530a, while the output-side amplifier may be as shown with respect to amplifier 630b, or vice-versa, or some combination thereof.

Figure 7:
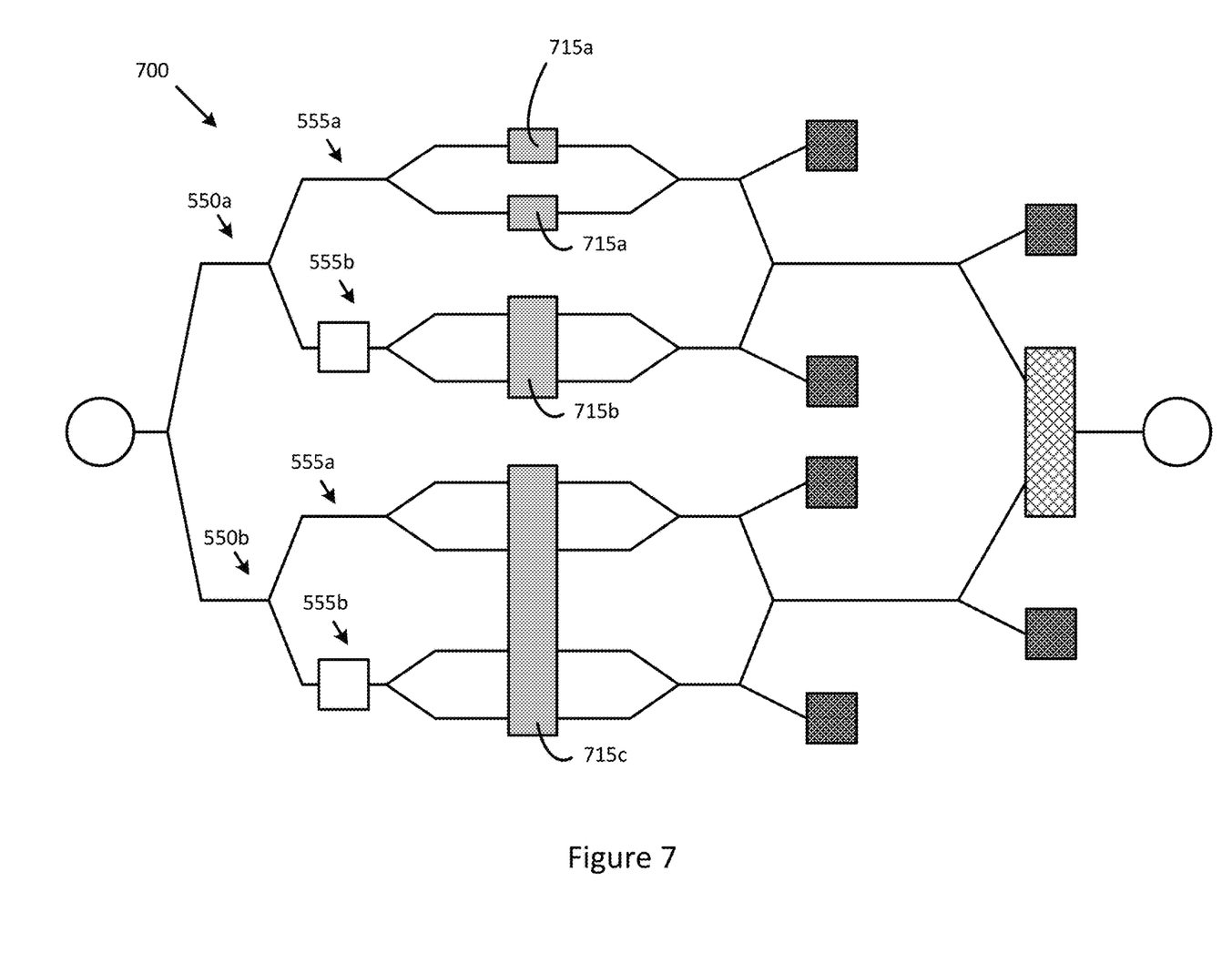
FIG. 7 depicts an alternative example optical architecture that includes a hybrid modulator, in accordance with various embodiments.

FIG. 7 depicts an alternative example optical architecture 700 which may be generally similar to, and share one or more characteristics with, optical architecture 500 or some other optical architecture herein. As may be seen, in order to illustrate one example concept related to the present disclosure, optical architecture 700 may not include one or more of the amplifiers such as amplifiers 530a or 530b.

As may be seen, the optical architecture 700 may depict variations on modulator configuration which may be present in various embodiments. Specifically, the optical architecture 700 may include a variety of modulators 715a, 715b, and 715c (collectively referred to as "modulators 715") which may be similar to, and share one or more characteristics with, modulators 115 or some other modulator herein. As may be seen, a separate III-V based modulator die 715a may be present on each of the two optical paths of a MZM. As another example, a single III-V based modulator die 715b may span both optical paths of a MZM. As another example, a single III-V based modulator die 715c may span a plurality of MZMs, which works in conjunction together with each of the underlining MZM silicon waveguides to form a hybrid MZM in each of the segments. Other embodiments may have other variations.

As noted, FIGS. 1-7 are intended as highly simplified examples, and certain Figures may have certain characteristics that are featured for the sake of discussion herein. However, it will be understood that features of various of the Figures may be combined with features of others of the Figures.

Figure 8:
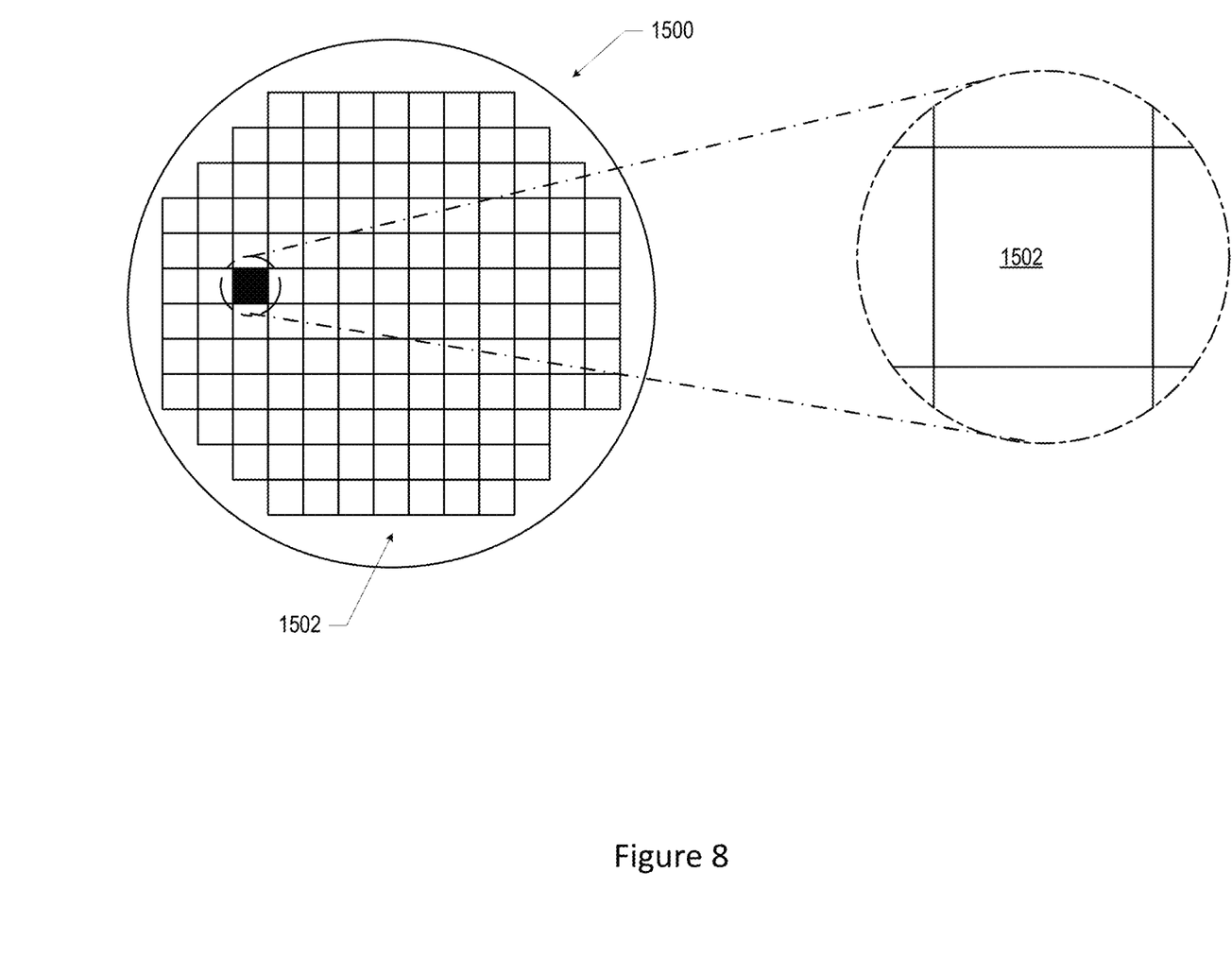
FIG. 8 is a top view of a wafer and dies that may include a hybrid modulator, in accordance with various embodiments.

FIG. 8 is a top view of a wafer 1500 and dies 1502 that may include one or more hybrid modulators, or may be included in an IC package including one or more hybrid modulators in accordance with various embodiments. The wafer 1500 may be composed of semiconductor material and may include one or more dies 1502 having IC structures formed on a surface of the wafer 1500. Each of the dies 1502 may be a repeating unit of a semiconductor product that includes a suitable IC. After the fabrication of the semiconductor product is complete, the wafer 1500 may undergo a singulation process in which the dies 1502 are separated from one another to provide discrete "chips" of the semiconductor product. The die 1502 may include one or more hybrid modulators, one or more transistors or supporting circuitry to route electrical signals to the transistors, or some other IC component. In some embodiments, the wafer 1500 or the die 1502 may include a memory device (e.g., a random-access memory (RAM) device, such as a static RAM (SRAM) device, a magnetic RAM (MRAM) device, a resistive RAM (RRAM) device, a conductive-bridging RAM (CBRAM) device, etc.), a logic device (e.g., an AND, OR, NAND, or NOR gate), or any other suitable circuit element. Multiple ones of these devices may be combined on a single die 1502. For example, a memory array formed by multiple memory devices may be formed on a same die 1502 as a processing device (e.g., the processing device 1802 of FIG. 9) or other logic that is configured to store information in the memory devices or execute instructions stored in the memory array.

Figure 9:
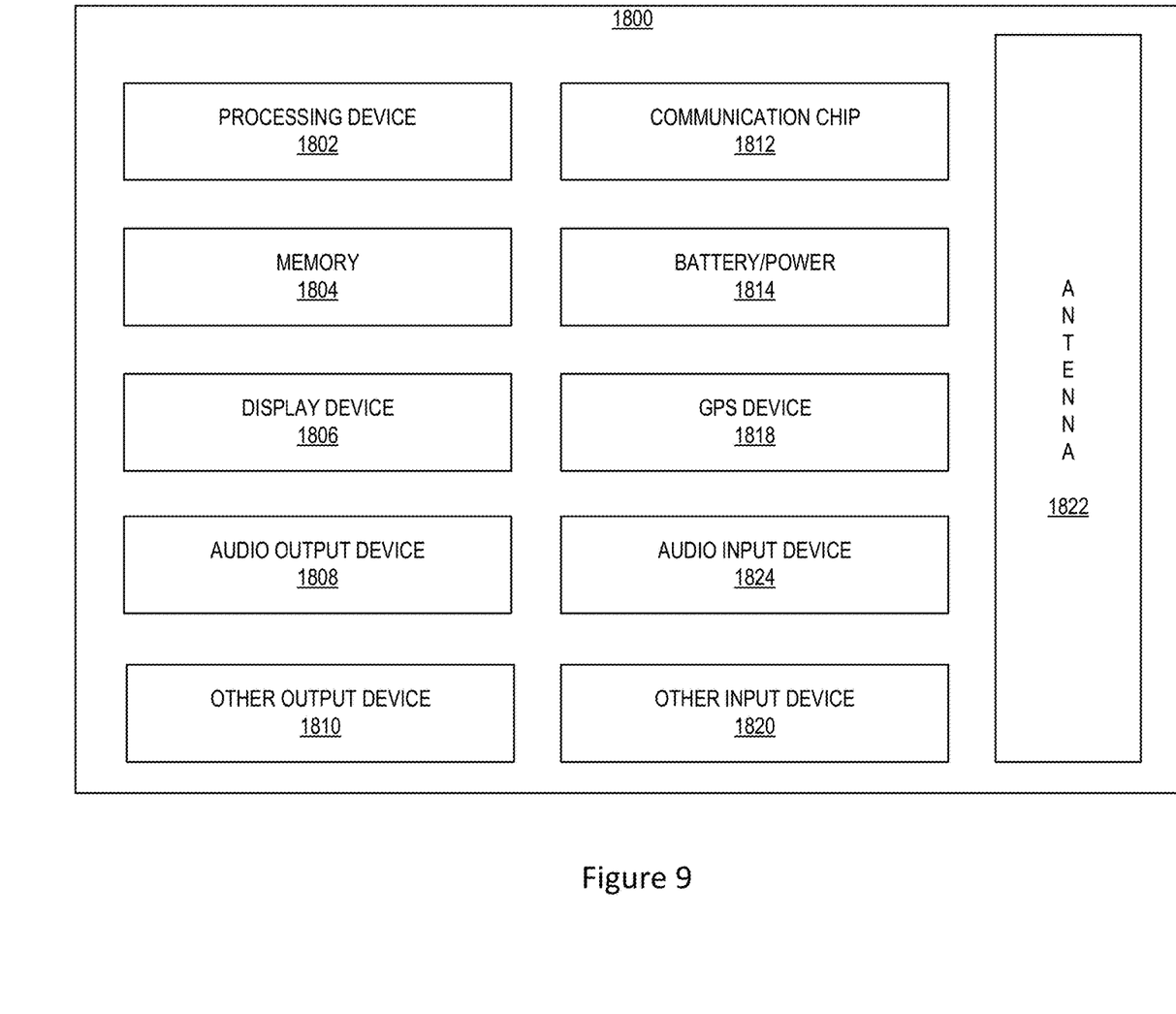
FIG. 9 is a block diagram of an example electrical device that may include an optical architecture with a hybrid modulator, in accordance with various embodiments.

FIG. 9 is a block diagram of an example electrical device 1800 that may include one or more hybrid modulators, in accordance with any of the embodiments disclosed herein. For example, any suitable ones of the components of the electrical device 1800 may include one or more of the IC device assemblies, IC packages, IC devices, or dies 1502 disclosed herein. A number of components are illustrated in FIG. 9 as included in the electrical device 1800, but any one or more of these components may be omitted or duplicated, as suitable for the application. In some embodiments, some or all of the components included in the electrical device 1800 may be attached to one or more motherboards. In some embodiments, some or all of these components are fabricated onto a single system-on-a-chip (SoC) die.

Additionally, in various embodiments, the electrical device 1800 may not include one or more of the components illustrated in FIG. 9, but the electrical device 1800 may include interface circuitry for coupling to the one or more components. For example, the electrical device 1800 may not include a display device 1806, but may include display device interface circuitry (e.g., a connector and driver circuitry) to which a display device 1806 may be coupled. In another set of examples, the electrical device 1800 may not include an audio input device 1824 or an audio output device 1808, but may include audio input or output device interface circuitry (e.g., connectors and supporting circuitry) to which an audio input device 1824 or audio output device 1808 may be coupled.

The electrical device 1800 may include a processing device 1802 (e.g., one or more processing devices). As used herein, the term "processing device" or "processor" may refer to any device or portion of a device that processes electronic data from registers and/or memory to transform that electronic data into other electronic data that may be stored in registers and/or memory. The processing device 1802 may include one or more DSPs, application-specific integrated circuits (ASICs), CPUs, graphics processing units (GPUs), cryptoprocessors (specialized processors that execute cryptographic algorithms within hardware), server processors, or any other suitable processing devices. The electrical device 1800 may include a memory 1804, which may itself include one or more memory devices such as volatile memory (e.g., dynamic RAM (DRAM)), nonvolatile memory (e.g., read-only memory (ROM)), flash memory, solid state memory, and/or a hard drive. In some embodiments, the memory 1804 may include memory that shares a die with the processing device 1802. This memory may be used as cache memory and may include embedded DRAM (eDRAM) or spin transfer torque magnetic RAM (STT-MRAM).

In some embodiments, the electrical device 1800 may include a communication chip 1812 (e.g., one or more communication chips). For example, the communication chip 1812 may be configured for managing wireless communications for the transfer of data to and from the electrical device 1800. The term "wireless" and its derivatives may be used to describe circuits, devices, systems, methods, techniques, communications channels, etc., that may communicate data through the use of modulated electromagnetic radiation through a nonsolid medium. The term does not imply that the associated devices do not contain any wires, although in some embodiments they might not.

The communication chip 1812 may implement any of a number of wireless standards or protocols, including but not limited to Institute for Electrical and Electronic Engineers (IEEE) standards including Wi-Fi (IEEE 802.11 family), IEEE 802.16 standards (e.g., IEEE 802.16-2005 Amendment), Long-Term Evolution (LTE) project along with any amendments, updates, and/or revisions (e.g., advanced LTE project, ultra mobile broadband (UMB) project (also referred to as "3GPP2"), etc.). IEEE 802.16 compatible Broadband Wireless Access (BWA) networks are generally referred to as WiMAX networks, an acronym that stands for Worldwide Interoperability for Microwave Access, which is a certification mark for products that pass conformity and interoperability tests for the IEEE 802.16 standards. The communication chip 1812 may operate in accordance with a Global System for Mobile Communication (GSM), General Packet Radio Service (GPRS), Universal Mobile Telecommunications System (UMTS), High-Speed Packet Access (HSPA), Evolved HSPA (E-HSPA), or LTE network. The communication chip 1812 may operate in accordance with Enhanced Data for GSM Evolution (EDGE), GSM EDGE Radio Access Network (GERAN), Universal Terrestrial Radio Access Network (UTRAN), or Evolved UTRAN (E-UTRAN). The communication chip 1812 may operate in accordance with Code Division Multiple Access (CDMA), Time Division Multiple Access (TDMA), Digital Enhanced Cordless Telecommunications (DECT), Evolution-Data Optimized (EV-DO), and derivatives thereof, as well as any other wireless protocols that are designated as 3G, 4G, 5G, and beyond. The communication chip 1812 may operate in accordance with other wireless protocols in other embodiments. The electrical device 1800 may include an antenna 1822 to facilitate wireless communications and/or to receive other wireless communications (such as AM or FM radio transmissions).

In some embodiments, the communication chip 1812 may manage wired communications, such as electrical, optical, or any other suitable communication protocols (e.g., the Ethernet). As noted above, the communication chip 1812 may include multiple communication chips. For instance, a first communication chip 1812 may be dedicated to shorter-range wireless communications such as Wi-Fi or Bluetooth, and a second communication chip 1812 may be dedicated to longer-range wireless communications such as global positioning system (GPS), EDGE, GPRS, CDMA, WiMAX, LTE, EV-DO, or others. In some embodiments, a first communication chip 1812 may be dedicated to wireless communications, and a second communication chip 1812 may be dedicated to wired communications.

The electrical device 1800 may include battery/power circuitry 1814. The battery/power circuitry 1814 may include one or more energy storage devices (e.g., batteries or capacitors) and/or circuitry for coupling components of the electrical device 1800 to an energy source separate from the electrical device 1800 (e.g., AC line power).

The electrical device 1800 may include a display device 1806 (or corresponding interface circuitry, as discussed above). The display device 1806 may include any visual indicators, such as a heads-up display, a computer monitor, a projector, a touchscreen display, a liquid crystal display (LCD), a light-emitting diode display, or a flat panel display.

The electrical device 1800 may include an audio output device 1808 (or corresponding interface circuitry, as discussed above). The audio output device 1808 may include any device that generates an audible indicator, such as speakers, headsets, or earbuds.

The electrical device 1800 may include an audio input device 1824 (or corresponding interface circuitry, as discussed above). The audio input device 1824 may include any device that generates a signal representative of a sound, such as microphones, microphone arrays, or digital instruments (e.g., instruments having a musical instrument digital interface (MIDI) output).

The electrical device 1800 may include a GPS device 1818 (or corresponding interface circuitry, as discussed above). The GPS device 1818 may be in communication with a satellite-based system and may receive a location of the electrical device 1800, as known in the art.

The electrical device 1800 may include another output device 1810 (or corresponding interface circuitry, as discussed above). Examples of the other output device 1810 may include an audio codec, a video codec, a printer, a wired or wireless transmitter for providing information to other devices, or an additional storage device.

The electrical device 1800 may include another input device 1820 (or corresponding interface circuitry, as discussed above). Examples of the other input device 1820 may include an accelerometer, a gyroscope, a compass, an image capture device, a keyboard, a cursor control device such as a mouse, a stylus, a touchpad, a bar code reader, a Quick Response (QR) code reader, any sensor, or a radio frequency identification (RFID) reader.

The electrical device 1800 may have any desired form factor, such as a handheld or mobile electrical device (e.g., a cell phone, a smart phone, a mobile internet device, a music player, a tablet computer, a laptop computer, a netbook computer, an ultrabook computer, a personal digital assistant (PDA), an ultra mobile personal computer, etc.), a desktop electrical device, a server device or other networked computing component, a printer, a scanner, a monitor, a set-top box, an entertainment control unit, a vehicle control unit, a digital camera, a digital video recorder, or a wearable electrical device. In some embodiments, the electrical device 1800 may be any other electronic device that processes data.

Examples of Various Embodiments

Example 1 includes an electronic device comprising: a signal input to provide an input signal; a splitter to separate the input signal into an in-phase portion of the input signal and a quadrature portion of the input signal; a modulator to modulate the in-phase portion of the input signal and the quadrature portion of the input signal to respectively produce a modulated in-phase portion of the input signal and a modulated quadrature portion of the input signal, wherein the modulator includes a III-V material on a silicon substrate; and a coupler to couple the modulated in-phase portion of the input signal and the modulated quadrature portion of the input signal to form an output signal.

Example 2 includes the electronic device of example 1, wherein the III-V material includes InP.

Example 3 includes the electronic device of examples 1 or 2, further comprising an amplifier communicatively coupled with the modulator.

Example 4 includes the electronic device of example 3, wherein the amplifier is to amplify the input signal, the in-phase portion of the input signal, or the quadrature portion of the input signal.

Example 5 includes the electronic device of example 3, wherein the amplifier is to amplify the modulated in-phase portion of the input signal, the modulated quadrature portion of the input signal, or the output signal.

Example 6 includes the electronic device of examples 1 or 2, wherein the electronic device further comprises: a second signal input to provide a second input signal; a second splitter to separate the second input signal into an in-phase portion of the second input signal and a quadrature portion of the second input signal; and wherein the modulator is to modulate the in-phase portion of the second input signal and the quadrature portion of the second input signal.

Example 7 includes the electronic device of example 6, wherein the first input signal is a first polarization of an optical signal, and the second input signal is a second polarization of the optical signal.

Example 8 includes the electronic device of example 7, wherein the electronic device further includes a PRBC communicatively coupled with the coupler.

Example 9 includes an electronic device comprising: a splitter to separate an input signal into an in-phase portion and a quadrature portion; a modulator to modulate the in-phase portion of the input signal to produce a modulated in-phase portion, wherein the modulator includes InP on a silicon waveguide; and a coupler to couple the modulated in-phase portion and a modulated quadrature portion of the input signal to produce an output signal.

Example 10 includes the electronic device of example 9, wherein the modulator is a MZM.

Example 11 includes the electronic device of example 9, further comprising a power source that is to supply a half-wave voltage to the modulator, wherein the half-wave voltage is less than 2 volts.

Example 12 includes the electronic device of any of examples 9-11, further comprising a second modulator to modulate the quadrature portion of the input signal to produce a modulated quadrature portion, wherein the second modulator includes InP on a silicon waveguide.

Example 13 includes the electronic device of any of examples 9-11, wherein the modulator is further to modulate the quadrature portion of the input signal to produce a modulated quadrature portion.

Example 14 includes the electronic device of any of examples 9-11, wherein the modulator is further to modulate the in-phase portion of a second input signal to produce a second modulated in-phase portion.

Example 15 includes the electronic device of any of examples 9-11, wherein the electronic device further includes an amplifier communicatively coupled with the modulator.

Example 16 includes a MZM comprising: a signal input to receive an unmodulated optical signal; a signal output to output a modulated optical signal that is based on the unmodulated optical signal; a silicon waveguide on a substrate to facilitate transference of the optical signal between the signal input and the signal output; and a III-V material physically coupled with the silicon waveguide.

Example 17 includes the MZM of example 16, wherein the modulated optical signal is based on a modulated in-phase component of the unmodulated optical signal or a modulated quadrature component of the unmodulated optical signal.

Example 18 includes the MZM of example 16, wherein the modulated optical signal is based on a modulated in-phase component of the unmodulated optical signal and a modulated quadrature component of the unmodulated optical signal.

Example 19 includes the MZM of any of examples 16-18, wherein the MZM further comprises: a second signal input to receive a second unmodulated optical signal; and a second signal output to output a second modulated optical signal that is based on the second unmodulated optical signal.

Example 20 includes the MZM of any of examples 16-18, wherein the III-V material includes InP.

Various embodiments may include any suitable combination of the above-described embodiments including alternative (or) embodiments of embodiments that are described in conjunctive form (and) above (e.g., the "and" may be "and/or"). Furthermore, some embodiments may include one or more articles of manufacture (e.g., non-transitory computer-readable media) having instructions, stored thereon, that when executed result in actions of any of the above-described embodiments. Moreover, some embodiments may include apparatuses or systems having any suitable means for carrying out the various operations of the above-described embodiments.

The above description of illustrated embodiments, including what is described in the Abstract, is not intended to be exhaustive or limiting as to the precise forms disclosed. While specific implementations of, and examples for, various embodiments or concepts are described herein for illustrative purposes, various equivalent modifications may be possible, as those skilled in the relevant art will recognize. These modifications may be made in light of the above detailed description, the Abstract, the Figures, or the claims.

The invention claimed is:

1. An electronic device, comprising:
   a signal input to receive an input signal;
   a splitter to separate the input signal into an in-phase portion of the input signal and a quadrature portion of the input signal;
   a modulator arrangement to modulate the in-phase portion of the input signal to generate a modulated in-phase portion of the input signal and to modulate the quadrature portion of the input signal to generate a modulated quadrature portion of the input signal; and
   a coupler to form an output signal based on the modulated in-phase portion of the input signal and the modulated quadrature portion of the input signal,
   wherein the modulator arrangement includes a substrate comprising silicon, one or more quantum wells comprising a III-V material, and a waveguide between the substrate and the III-V material, the waveguide comprising silicon.

2. The electronic device of claim 1, wherein the III-V material includes indium and phosphorous.

3. The electronic device of claim 1, further comprising an amplifier communicatively coupled with the modulator arrangement.

4. The electronic device of claim 3, wherein the amplifier is to amplify at least one of the input signal, the in-phase portion of the input signal, or the quadrature portion of the input signal.

5. The electronic device of claim 3, wherein the amplifier is to amplify at least one of the modulated in-phase portion of the input signal, the modulated quadrature portion of the input signal, or the output signal.

6. The electronic device of claim 1, wherein the input signal is a first input signal, and wherein the electronic device further comprises:
   a second signal input to receive a second input signal;
   a second splitter to separate the second input signal into an in-phase portion of the second input signal and a quadrature portion of the second input signal; and
   wherein the modulator arrangement is to modulate the in-phase portion of the second input signal and the quadrature portion of the second input signal.

7. The electronic device of claim 6, wherein the first input signal has a first polarization, and the second input signal has a second polarization, different from the first polarization.

8. The electronic device of claim 6, further comprising a polarization rotator and beam combiner (PRBC) communicatively coupled with the coupler.

9. The electronic device of claim 1, wherein:
   the waveguide extends along an axis,
   the III-V material extends along the axis, and
   a dimension of the III-V material in a direction perpendicular to the axis is different from a dimension of the waveguide in the direction perpendicular to the axis.

10. The electronic device of claim 9, wherein the III-V material tapers in a direction of the axis.

11. The electronic device of claim 1, wherein the modulator arrangement further includes a buried layer of an insulator material, wherein the buried layer is between the substrate and the waveguide, and the waveguide is between the buried layer and the III-V material.

12. An electronic device, comprising:
   a splitter to separate an input signal into an in-phase portion and a quadrature portion;
   a modulator to modulate the in-phase portion of the input signal to produce a modulated in-phase portion and further to modulate the in-phase portion of a second input signal to produce a second modulated in-phase portion, wherein the modulator includes indium and phosphorous over a waveguide that includes silicon; and
   a coupler to couple the modulated in-phase portion and a modulated quadrature portion of the input signal to produce an output signal.

13. The electronic device of claim 12, wherein the modulator is a Mach-Zehnder modulator (MZM).

14. The electronic device of claim 12, further comprising a power source that is to supply a half-wave voltage to the modulator, wherein the half-wave voltage is less than 2 volts.

15. The electronic device of claim 12, further comprising a second modulator to modulate the quadrature portion of the input signal to produce a modulated quadrature portion.

16. The electronic device of claim 12, wherein the modulator is further to modulate the quadrature portion of the input signal.

17. The electronic device of claim 12, wherein the electronic device further includes an amplifier communicatively coupled with the modulator.

18. A modulator, comprising:
   a signal input;
   a signal output;
   a waveguide, wherein the waveguide includes silicon and is coupled between the signal input and the signal input; and
   a quantum well comprising a III-V material, wherein the quantum well is physically coupled with the waveguide, and wherein a width of the quantum well is different from a width of the waveguide.

19. The modulator of claim 18, wherein the signal input is to receive an unmodulated optical signal, and wherein the signal output is to output a modulated optical signal that is based on a modulated in-phase component of the unmodulated optical signal or a modulated quadrature component of the unmodulated optical signal.

20. The modulator of claim 18, wherein the signal input is to receive an unmodulated optical signal, and wherein the signal output is to output a modulated optical signal that is based on a modulated in-phase component of the unmodulated optical signal and a modulated quadrature component of the unmodulated optical signal.

21. The modulator of claim 18, further comprising:
   a second signal input to receive a second unmodulated optical signal; and
   a second signal output to output a second modulated optical signal that is based on the second unmodulated optical signal.

22. The modulator of claim 18, wherein the III-V material includes indium and phosphorous.

23. The modulator of claim 18, wherein the modulator is a Mach-Zehnder modulator.

24. The modulator of claim 18, wherein the signal input is to receive an unmodulated optical signal, and the signal output is to output a modulated optical signal that is based on the unmodulated optical signal.

* * * * *

UNITED STATES PATENT AND TRADEMARK OFFICE
CERTIFICATE OF CORRECTION

| | | |
|---|---|---|
| PATENT NO. | : 12,078,909 B2 | Page 1 of 1 |
| APPLICATION NO. | : 16/877113 | |
| DATED | : September 3, 2024 | |
| INVENTOR(S) | : Jin Hong et al. | |

It is certified that error appears in the above-identified patent and that said Letters Patent is hereby corrected as shown below:

In the Claims

In Column 15, Claim 8, Line 51, delete "claim 6," and insert -- claim 7, --, therefor.

Signed and Sealed this
Fifteenth Day of July, 2025

Coke Morgan Stewart
*Acting Director of the United States Patent and Trademark Office*